(12) United States Patent
Linder et al.

(10) Patent No.: US 8,581,168 B2
(45) Date of Patent: Nov. 12, 2013

(54) DUAL WELL READ-OUT INTEGRATED CIRCUIT (ROIC)

(75) Inventors: Lloyd F. Linder, Agoura Hills, CA (US); Daniel Renner, Summerland, CA (US); Michael MacDougal, Camarillo, CA (US); Jonathan Geske, Ventura, CA (US); R. Jacob Baker, Boise, ID (US)

(73) Assignee: Flir Systems, Inc., Wilsonville, OR (US)

( * ) Notice: Subject to any disclaimer, the term of this patent is extended or adjusted under 35 U.S.C. 154(b) by 307 days.

(21) Appl. No.: 13/074,290

(22) Filed: Mar. 29, 2011

(65) Prior Publication Data

US 2012/0248288 A1 Oct. 4, 2012

(51) Int. Cl.
*H01L 27/00* (2006.01)
*G01J 1/44* (2006.01)

(52) U.S. Cl.
USPC ............... 250/208.1; 250/214 R; 250/339.01; 348/222.1; 348/349

(58) Field of Classification Search
USPC ....... 250/208.1, 214.1, 214 R, 341.1, 339.01; 257/290, 291, 292; 348/349, 364, 348/222.1
See application file for complete search history.

(56) References Cited

U.S. PATENT DOCUMENTS

| | | | |
|---|---|---|---|
| 6,040,568 A | 3/2000 | Caulfield et al. | |
| 6,323,941 B1 | 11/2001 | Evans et al. | |
| 8,319,166 B2 * | 11/2012 | Kawahito | 250/208.1 |
| 2004/0004707 A1 | 1/2004 | DeFlumere | |
| 2008/0272227 A1 | 11/2008 | Sharpe | |

* cited by examiner

*Primary Examiner* — Kevin Pyo
(74) *Attorney, Agent, or Firm* — Haynes and Boone, LLP

(57) ABSTRACT

A single camera capable of capturing high speed laser return pulses for a target, as well as provide imaging information on the background of the target. This capability is enabled by having a read-out integrated circuit (ROIC) capable of extracting both types of information from a pixel of a focal plane array (FPA). Further, an ROIC topology that allows for the ability to distinguish between high frequency and low frequency signal paths, and provide supporting circuitry to process the two paths separately. One path may integrate the low frequency background scene to provide a high fidelity image of the scene. The second path may process high frequency noise and multiple laser pulse returns within a frame. These two paths may be combined to provide a background image with a superimposed laser return.

20 Claims, 9 Drawing Sheets

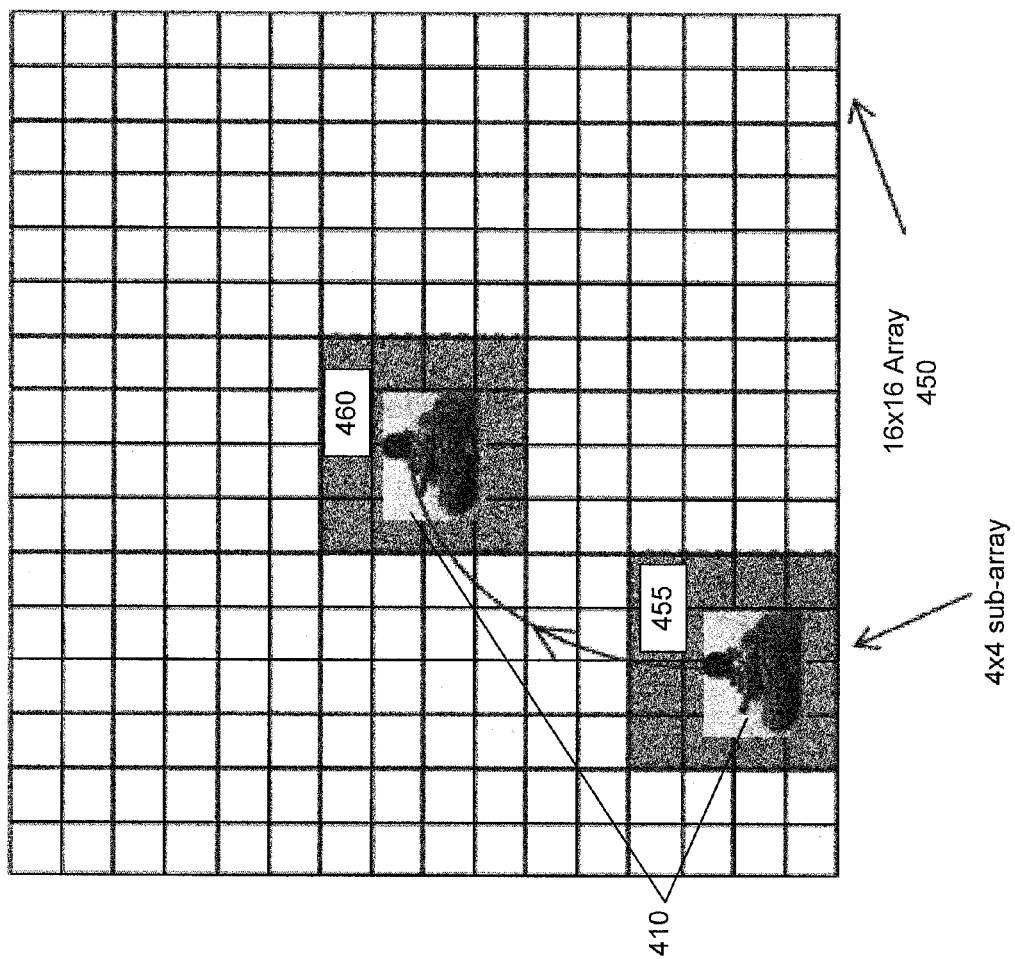

DUAL WELL READ-OUT INTEGRATED CIRCUIT (ROIC)

FIELD

Embodiments of the invention generally pertain to electrical circuits and more particularly to image data processing circuitry.

BACKGROUND

Infrared imaging is used for a variety of applications, including nighttime surveillance, target acquisition and tracking, and atmospheric imaging. Infrared imaging is typical done using a focal plane array (FPA), a device comprising material capable of absorbing radiation over a broad spectral band such as infrared, in the process generating electrical carriers (electrons or holes) within the material.

The material of the FPA is selectively doped to form an array of photodetectors. A bias voltage is applied to the material so that the array of photodetectors can transfer the electrical carriers generated by the incident photons into a pixilated image pattern of electrical currents. A read-out integrated circuit (ROIC) consists of control and readout circuitry and an array of input cells each attached electrically to an element of the array of photodetectors. The ROIC processes the currents generated by each photodetector and reads out their magnitude as a stream of currents, voltages, or digital bits.

Current solutions for target acquisition utilize an FPA to detect high speed laser pulses that are reflected by a target upon being illuminated by a laser designator. It is desirable in many instances to capture imaging information on the background of the target; current solutions require a separate FPA to capture this information. Thus, two "cameras"—one for capturing target image information, and another for capturing target-related background image information, are required. This solution is sub-optimal for various reasons including but not limited to: the extra work related to "aligning" both cameras, the extra expense of installing two cameras, and the added weight of the second camera, the latter reason being extremely detrimental for aerial devices (e.g., missiles) utilizing laser guidance systems.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIGS. 4A and 4B illustrate an example use for a system utilizing an embodiment of the invention.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention describe solutions directed towards having a single camera capable of capturing high speed laser return pulses for a target, as well as providing imaging information on the background of the target. This capability is enabled by having a dual well read-out integrated circuit (ROIC) capable of extracting both types of information from a pixel/photodetector of a focal plane array (FPA).

Embodiments of the invention describe an ROIC with unique architectural features to enable this type of data extraction. The circuit topology described below allows for the ability to distinguish between high frequency and low frequency signal paths, and provide supporting circuitry to process the two paths separately.

The unit cell design for dual well ROICs supports two charge processing paths. One path integrates the low frequency background scene to provide a high fidelity image of the scene. The second path processes the high frequency noise and multiple laser pulse returns within a frame. These two paths can be combined to provide a background image with a superimposed laser return.

ROICs according to embodiments of the invention will output analog signals to be received, for example, by an interfaced back-end signal processor, which will include the necessary data conversion circuitry. Detection and location within the FPA of an input laser spot may be determined digitally by the back-end signal processor after analog-to-digital conversion (ADC) of the output of the ROIC. Once the location of the laser spot has been determined, the off-board processor may select a sub-array of the dual well ROIC unit cells, where the location of the laser spot has been determined, and develop a high fidelity image of both the target and the background.

Current FPA imaging systems have employed a number of different detector technologies to detect laser energy (e.g., at 1064 nm). For example, FPA imaging systems may be used to provide a "see-spot" capability for a laser designator system—i.e., detecting a laser to an imaging system for the purposes of range finding, target tracking and recognition, etc. In these "see-spot" systems, the image data capture is gated in order to coincide with the reception of the laser pulse return. This gating of the image data capture requires the system to have information on the distance of the target and the time of arrival of the laser pulse return.

Figure 1A:
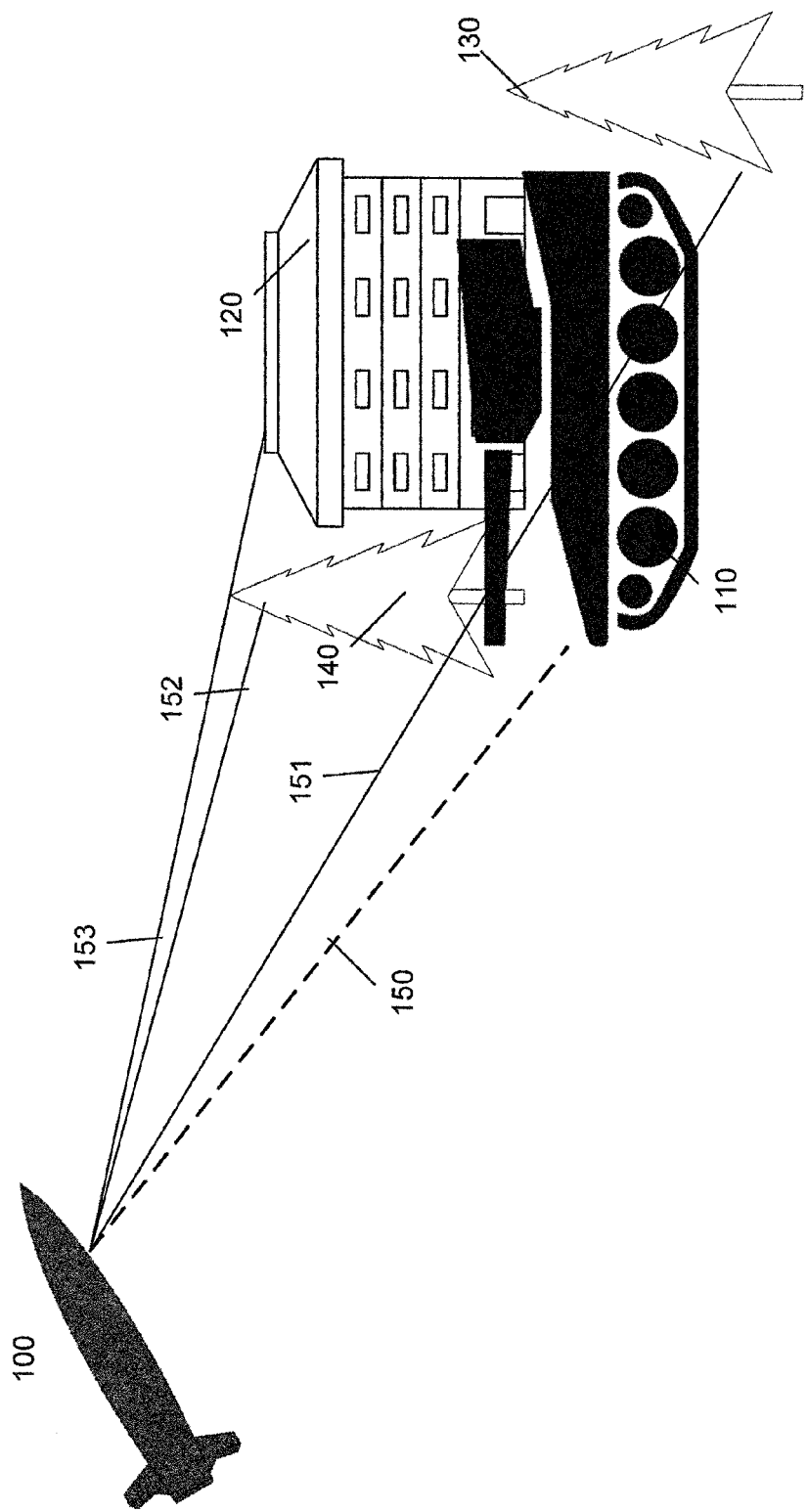
FIG. 1A is a diagram of an example setting wherein embodiments of the invention may be used.

It is understood that the gating required in current FPA imaging systems eliminates the ability to capture image data for the video imagery surrounding the detected laser. FIG. 1A is a diagram on an example setting wherein embodiments of the invention may be used. In this example setting, target 110 and background objects 120, 130 and 140 are in the field of view (FOV) of missile 100. In prior art solutions, missile 100 is equipped with a single FPA imaging system; this imager is only active to charge wells of a corresponding prior art ROIC when laser pulse return 150 is expected. This results in only the laser spot itself (i.e., on target 110) being seen during the frame, because the background scene that surrounds the spot (e.g., background objects 120, 130 and 140) does not provide enough photons to the imager to produce a useful image.

Integration operations related to the processing of received image data in the prior art are on the order of the gated pulse width of the laser return in order to minimize the amount of noise integrated. There have been several approaches suggested to allow the FPA to have a wider gate pulse width; however, these approaches compromise frame rate for the passive imager, and the FPA would miss laser returns during the frame. Resultantly, there is a need for a dual well ROIC with two charge wells.

In embodiments of the invention, a charge well of a dual well ROIC is operated in passive mode in order to provide conventional imaging, and another charge well may be gated at the laser pulse repetition rate.

Figure 1B:
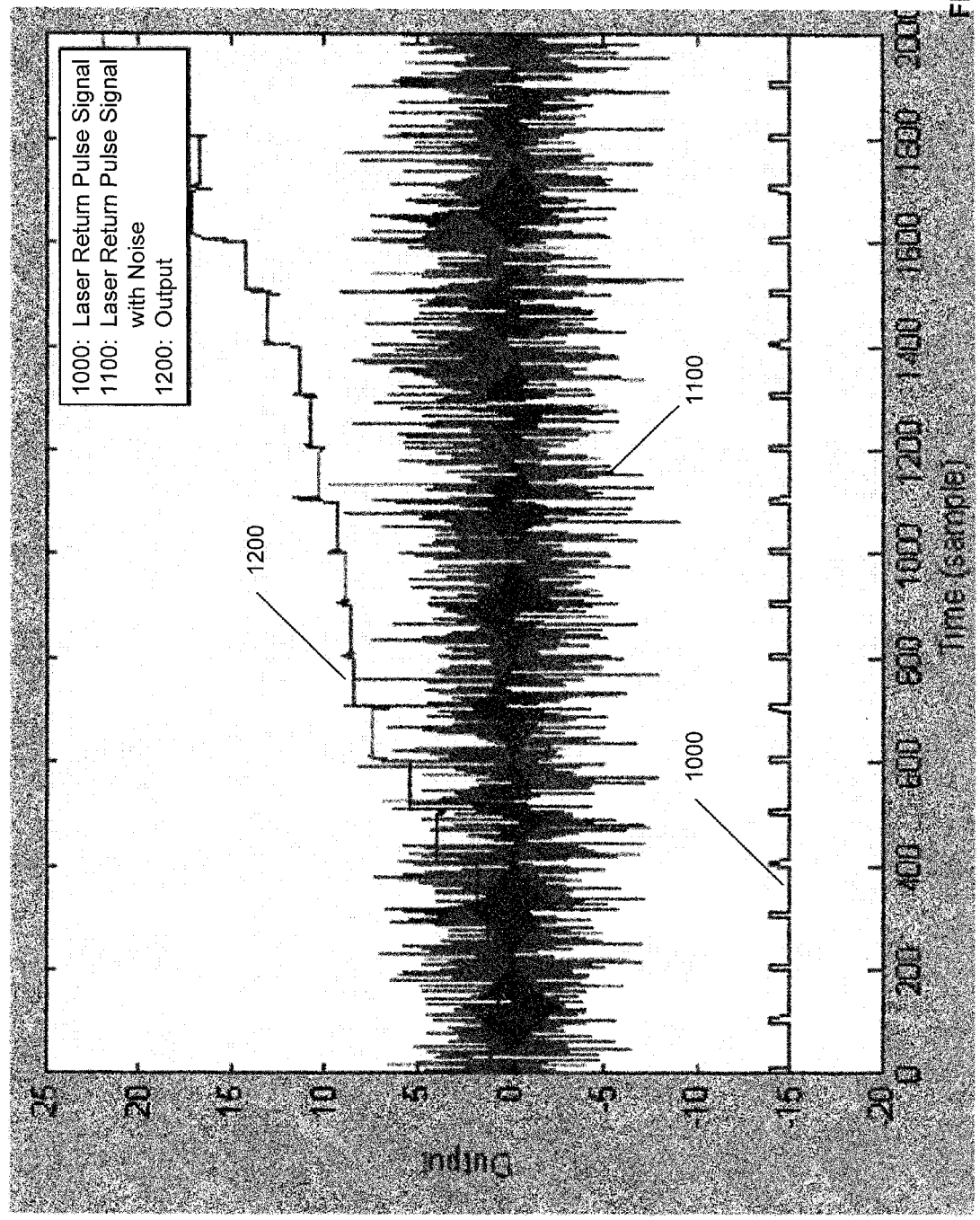
FIG. 1B is an example set of data that may be received by embodiments of the invention.

An example set of data captured and produced by embodiments of the invention that may be utilized by missile 100 is shown in FIG. 1B. Laser pulse return curve 1000 is a laser pulse (shown in FIG. 1A as reference element 150), with a repetition rate, that is received at a very low amplitude level. It is clear that in this example, the root mean square (RMS) power of each laser pulse return of curve 1000 is very low. Curve 1100 is the total signal that the FPA utilized by missile 100 will capture: noise, shown as beams 151-153, and laser return pulse 150 (i.e., the data from curve 1000).

From FIG. 1B, it can be seen that the amplitude of laser return pulse 150 (i.e., curve 1000) is significantly lower in amplitude than curve 1100, the total signal captured by the FPA. In order to locate and detect laser return pulse 150, a processing system associated with the FPA may integrate the noise and the laser return pulse over many returns. In FIG. 1B, the integrated output signal is shown as curve 1200. It is to be understood that integration of the noise and the laser pulse return allows laser return pulse signal 150 to be detected through the noise floor by enhancing the signal-to-noise (SNR) of the laser return.

The FPA sensor provides analog output signals that can be externally digitized for use in the signal processing engine that may perform the detection of the laser return. After the signal is detected, the coding of the laser return may also be determined by the signal processing system. ROICs according to embodiments of the invention may include a processing path to perform as a normal imaging path to provide information on the background scene (i.e., background objects 120, 130 and 140). The dual well signals of said ROICs, as described below, may be interleaved digitally to produce a composite image that contains the background imagery and the laser pulse return.

From a prior art perspective, it is understood that there does not exist a single ROIC that has active and passive signal processing paths in a single unit cell for the ROIC. As stated above, prior art solutions directed to this problem utilize two FPAs and with two distinct corresponding ROICs, one that processes the passive scene and one that processes the laser return. The integration of both passive and active imaging paths in a single ROIC has not been previously achieved. Embodiments of the invention allow this operation possible, and enable previously unachievable functionality in a single ROIC.

Embodiments of the invention enable, for example, missile 100 to have the functionality of two cameras in a single camera. It is to be understood that utilizing a single camera capable of providing the functionality of two cameras eliminates, for example, efforts related to "aligning" both cameras, the extra expense of installing two cameras, and the added weight of the second camera. Thus, embodiments of the invention allow for a single camera able to capture high speed laser return pulses for a target (e.g., target 110), as well as provide imaging information on the background of the target (e.g., background objects 120, 130 and 140). ROICs according to embodiments of the invention comprise a circuit topology that provides the ability to distinguish between high frequency and low frequency signal paths, and provide supporting circuitry to process the two paths separately.

The ROIC cell designs in embodiments of the invention may support two charge processing paths: a first path that may process high frequency noise (e.g., noise related to light sources or electronics) and/or multiple laser pulse returns within a frame, as exemplified by laser pulse return 150 in FIG. 1; and second path that may integrate the low frequency background scene to provide a high fidelity image of a scene (e.g., the background to target 110 as shown by objects 120, 130 and 140 of FIG. 1).

Figure 2:
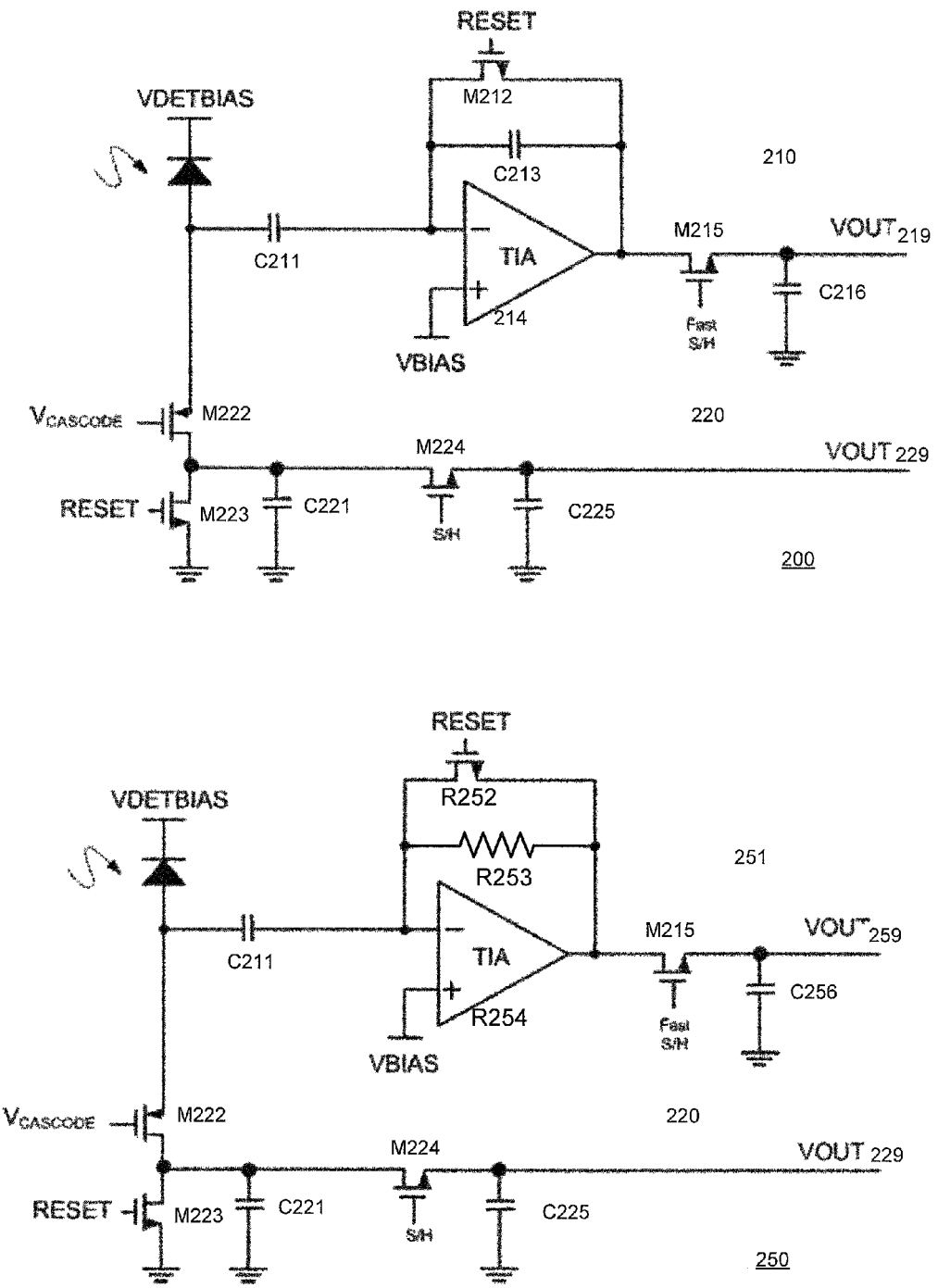
FIG. 2 includes block diagrams of embodiments of the invention.

FIG. 2 includes block diagrams of embodiments of the invention. ROICs 200 and 250 each include two distinct processing paths. In ROIC 200, path 210, as described below, will have the ability to detect laser pulses at, for example, 1064 nm, with pulse durations as short as 10 ns, and with pulse repetition rates as high as 20 kHz, with laser power as small as 25 uJ per pulse. Path 220, as described below, will have the ability to be used as a passive imager to provide video imagery at frame rates up to 60 Hz. It will be understood in view of the description below that by using this approach, the limitations of a conventional imager utilizing prior art ROICs will be overcome.

In ROIC 200, path 210 (i.e., the laser pulse path) is AC coupled and path 220 (i.e., the imaging path) is DC coupled. In this embodiment, path 220 is a low frequency Direct Injection (DI) path. This path will integrate low frequency background flux, and provide high resolution images of the scene. It is possible in other embodiments that a modified DI/capacitive transimpedance amplifier (CTIA) approach may allow for integration of low light levels.

For path 220, the input transistor that receives the low frequency signal is cascode device M222. The output of device M222 is a current that gets integrated onto the capacitor C221. Device M223 is the reset transistor. Prior to the beginning of every frame captured by an associated FPA pixel, M223 will discharge the stored charge on capacitor C221 to ground, and then will turn off, allowing capacitor C221 to start the integration process again.

Transistor M224 acts as a switch device, and allows the integrated charge on C221 to be transferred to capacitor C225 and to be read out during a read-out phase as VOUT 229. In other embodiments of the invention, low frequency path 220 may include a buffer between C221 and C225 in order to avoid charge sharing between the capacitors.

Path 210 is the high frequency path. The high frequency path will pass high frequency noise and the laser pulse return signal. AC coupling capacitor C211 and the frequency dependence of the input impedance of paths 210 and 220 may determine the effectiveness of separating the frequency content of the input signal. AC coupling capacitor C211 will drive operational amplifier 214, capacitor C213, and switch transistor device M212. It is understood that these devices form a CTIA, which is well known in the art. Thus, AC coupling capacitor C211 provides a path for the received charge to be integrated onto integration capacitor C213. The CTIA may integrate, for example, high frequency noise and a 20 ns laser pulse. Initially, the CTIA may integrate over the entire frame rate (e.g., 30-60 Hz), for possibly multiple frames, to locate the laser spot. Sampling switch device M215 will be used to sample the integrated signal, by having capacitor C216 receive the integrated charge of capacitor C213 to be read out of during a read-out phase as VOUT 219.

The location of a received laser spot may be determined digitally via a back-end processor operatively coupled to ROIC 200 (to receive VOUTs 219 and 229). Once the laser spot has been located, the back-end processor may further enable a high speed sampling clock to a sub-array of the ROIC array.

The output of the CTIAs in the sub-array may then be sampled, with sampling switch device M215, with a fast sample/hold clock (e.g., at least a 10 MHz sampling rate) in order to support the detection, and correlation in time, of the laser return signal that is buried in the noise floor.

In other embodiments, the received charge may not be integrated, but merely amplified. ROIC 250 is another embodiment nearly identical to that of ROIC 200, except instead of a CITA, high frequency path 251 utilizes a resistively loaded transimpedance amplifier (RITA), shown to comprise of operational amplifier 254, resistor 253 and switch transistor device 252. The amplified charge received by capacitor C256 from resistor 253 may be read out during a read-out phase as VOUT 259.

Figure 3:
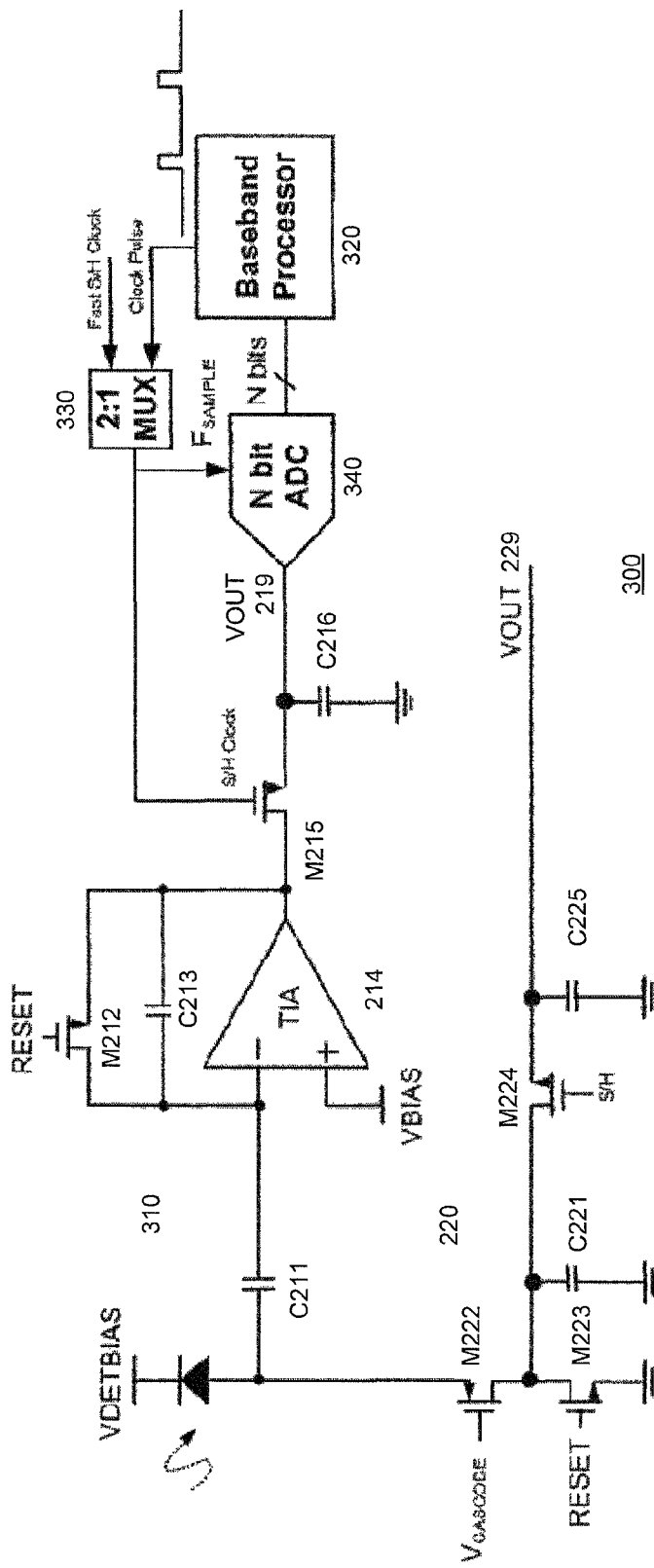
FIG. 3 is a block diagram of an embodiment of the invention.

FIG. 3 is a block diagram of an embodiment of the invention. The embodiment shown in FIG. 3 is identical to ROIC 200 shown in FIG. 2 but with the following additional details. The output of ROIC 300 will be an analog interface to off-board analog-to-digital converter (ADC) 340. In this embodiment, oversampling of received high-frequency signals will be performed at a sample rate to allow for digital detection of the input signal after the analog-to-digital conversion via ADC 340.

Once a laser pulse is detected via baseband processor 320, the pulse timing information can be correlated for the laser pulse return. Based on this determination, it is possible in embodiments of the invention for an additional adjustment of the sampling clock for sampling switch device M215 (via MUX 330) to only sample the input laser pulse at the laser repetition rate. It is to be understood that this allows for a reduction in DC power of ROIC 300, as well as an SNR enhancement, by not integrating the noise without the presence of a new pulse, thus improving the SNR of the signal by avoiding the integration of pure noise.

Figure 4A:
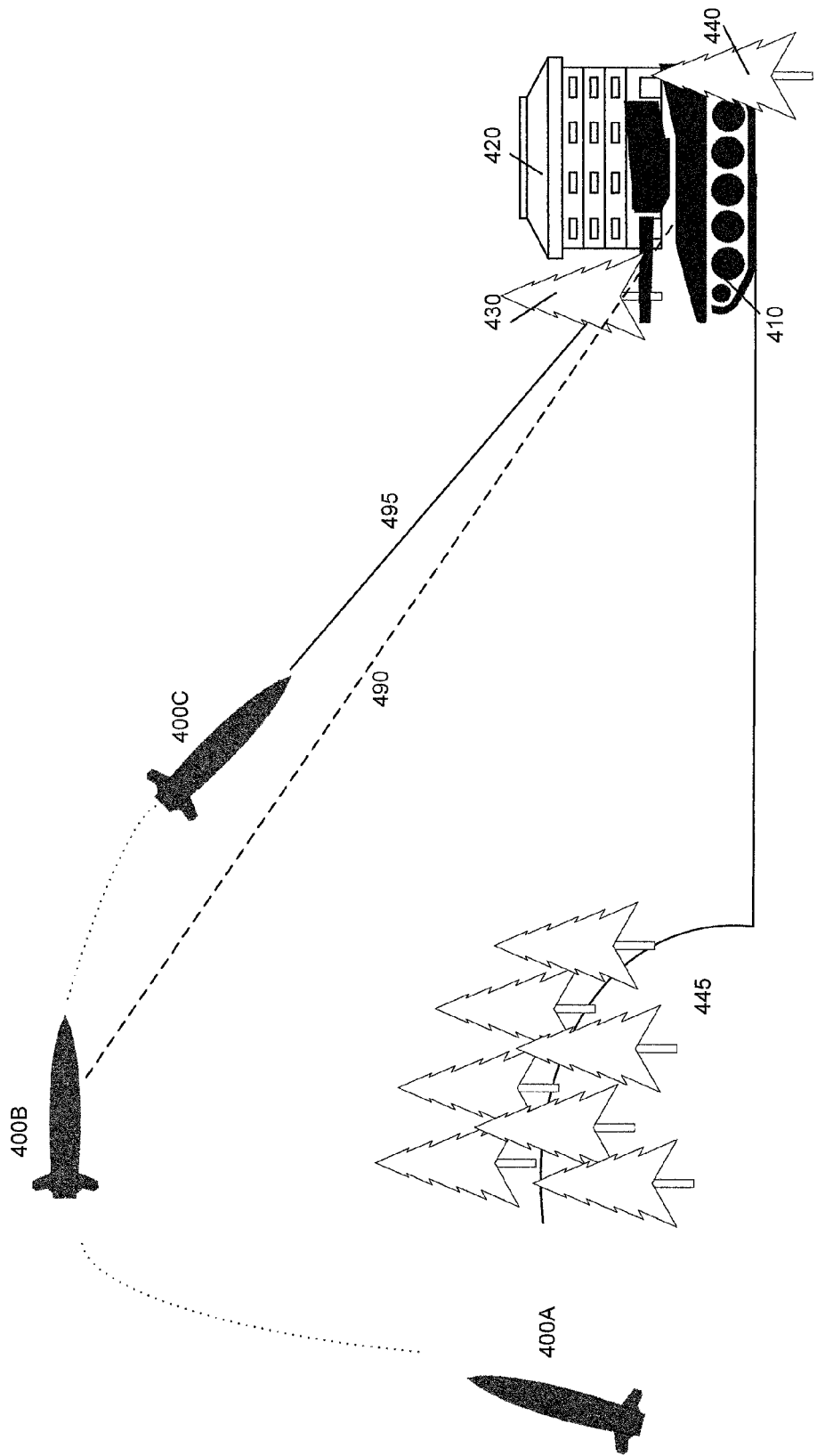

Initially, the CTIA of path 310 may integrate the high frequency noise and laser pulse return together, for one or more frames, at the frame rate. The integration of multiple pulse returns will generate a deterministic signal. The outputs of the second signal path may initially be read out of the array at the frame rate An example use for a system utilizing an embodiment of the invention is shown in FIGS. 4A and 4B. In this example, missile 400 is shown to include an FPA comprising a 16×16 array size, shown as array 450. Described below is a sub-arraying function enabled by embodiments of the invention. As shown on the right hand side of FIG. 4A, tank 410 is moving in between building 420 and trees 430 and 440. In this example scenario, tank 410 is being designated as a target through the use of a laser spot on this target (i.e., any laser spotting means known in the art). Missile 400 has been fired, and is to lock onto the target through the location of the laser spot in the FPA. Representations of missile 400, shown as 400A, 400B and 400C, show various stages of its flight and trajectory to the target.

Initially, in stage 400A of the flight of the missile, it does not see the spot (i.e., on tank 410) in its FOV due to hill 445. Stage 400B corresponds to the apogee of the missile's flight. At this stage the target, tank 410, has been located in the FOV via laser return pulse 490. Tank 410's location is further shown to be in the bottom left hand side of array 450 in FIG. 4B. The 16×16 array data is to be read-out via any ROIC described above and subsequently processed to locate tank 410 in the array. In one embodiment, the 16×16 array will sub-array to smaller 4×4 array 455, and the sample rate for the sub-array will increase as described above. As the missile moves through its various trajectories, the sub-array will move to the optimum position of the middle of array 450 (i.e., sub-array 460). The associated increase in sample rate described above may allow the back-end processor to sample through the noise floor, correlate to the laser return signal quickly, and thus determine the timing of laser pulse return 490. These operations will enable the missile at trajectory 400C to more accurately track target 410 via laser return pulse 495.

Figure 5:
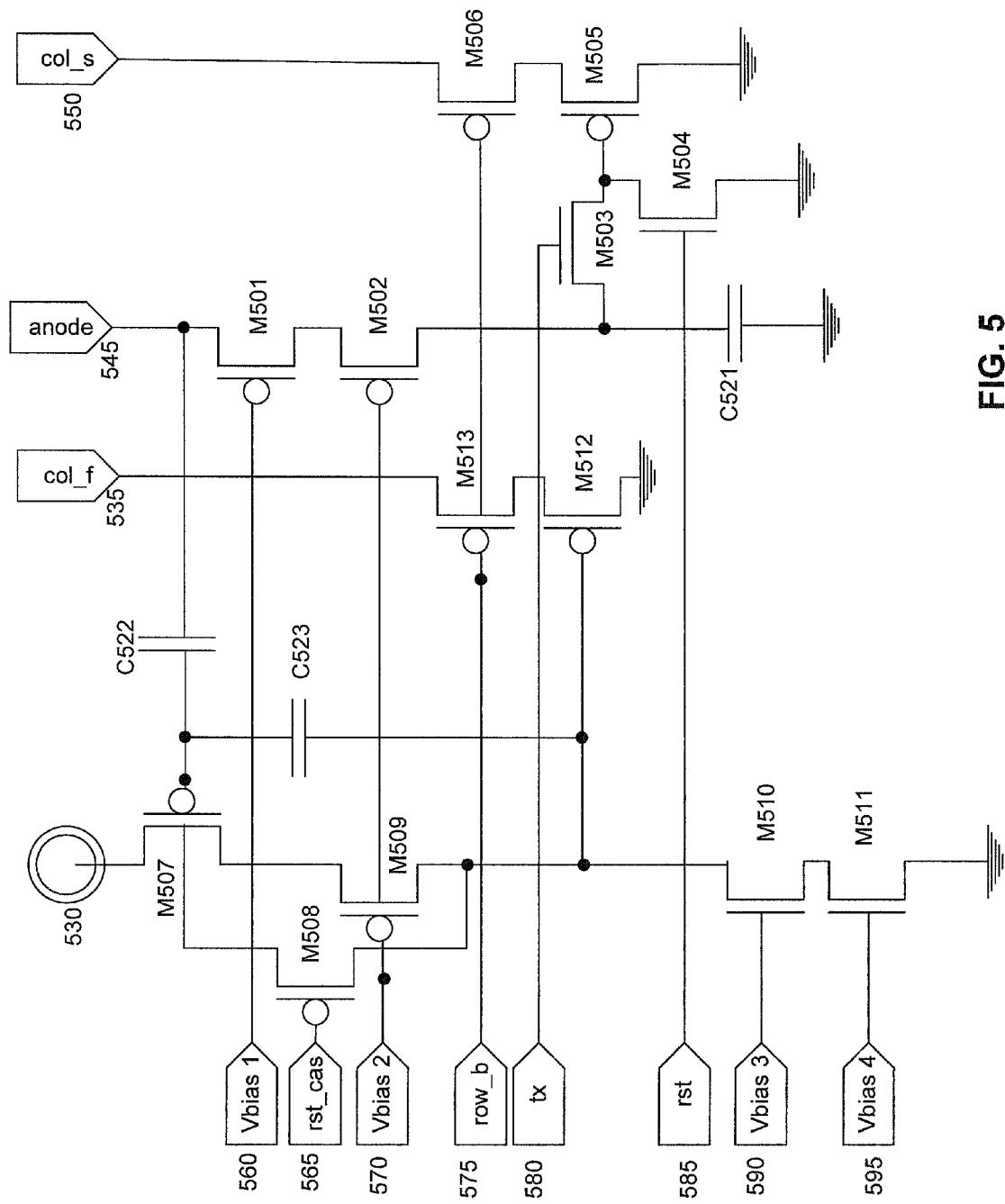
FIG. 5 is a transistor level diagram of an embodiment of the invention.

A transistor level implementation of a dual well unit cell architecture, functionally equivalent to ROIC 200 of FIG. 2, is shown in FIG. 5. In this embodiment, detector anode 545 is connected to PMOS cascode device M501 in the basic direct injection (DI) configuration. In other embodiments of the invention, buffered direct injection (BDI) may be used in order to reduce de-biasing concerns for the dynamic range needed to address daytime and night-time backgrounds. The gate of the DI PMOS transistor M501 is connected to detector bias Vbias1 560. This transistor is further isolated by additional PMOS cascode M502, the gate of which is tied to Vbias2 570. The drain of the second PMOS cascode M502 is high impedance, and it is a current mode interface for the low frequency imaging path (i.e., slow path). For the AC path, there is an AC coupling capacitor C522 at detector anode 545 (the source of PMOS cascode M501 above), that may couple a high frequency current pulse into a CITA.

For the slow path, the output of PMOS cascode device M502 is a current. In FIG. 5, there is additional 10 fF capacitor C521. It is to be understood that this additional capacitor is to emulate the load of the gain switching capability (not included in the figure). For the slow path, the operation can be described by first assuming the pixel is in the reset mode (i.e., both the shutter transistor device M504 and the switch transistor device M503 are on). This occurs when both rst 585 and tx 580 signals are high (i.e., equal to Vdd). This connects the gate of PMOS source follower device M505 to ground through switch transistor device M504 and discharges capacitor C521. When the signal from tx 580 goes low (i.e., transistor M503 turns off), the low frequency current of photodiode 545 is integrated by capacitor C521. Based upon the example of this embodiment, this should be on the order of 10 fF.

In this embodiment, after a given integration time, when signals for both row-select 575 and rst 585 go low (thus M504 shuts off and M506 turns on), signals from tx 580 go high (thus M503 turns on) and the integrated signal on capacitor C521 is transferred to the gate of M505. This information is then passed to the column line for measurement through the switch transistor device M506 that is turned on. The column line, labeled col_s 550, is connected to a current source pull-up outside a corresponding the pixel array (not shown).

For the AC path in FIG. 5, the AC coupling capacitor C522 has a value of 10 pF; if the capacitor value is large enough in value, the effective impedance of the capacitor is small relative to the impedance of the slow path. This allows the high-frequency and low-frequency signals to be separated right at detector 545. It is to be understood that the large value for capacitor C522 has pixel area implications, and in other embodiments this would have to be traded off with different implementations of this capacitor. Capacitor 522 may be implemented, for example, with metal-insulator-metal (MIM) or a CMOS device. With this approach, the AC coupled CTIA will receive and integrate the high speed pulse current from detector 545. The high frequency current is converted into to a voltage at the output through the integration of the current at the CTIA feedback capacitor C523.

Similar to the TIA block in ROIC 200 of FIG. 2, transistors M507, M509, M510, and M511 (and power supply 530) perform this function. In this embodiment, device M510 is a NMOS cascode device for the NMOS current source M511. Device M507 is a common source PMOS that is the input device of the TIA, and device M509 is a PMOS cascode. Device M508 is the reset switch device (functionally equivalent to the device labeled M212 in ROIC 200 of FIG. 2). In this embodiment, these devices collectively form the CTIA circuitry for the high frequency path (i.e., fast path). The CTIA will integrate the multiple return pulses and accumulate the integrated charge of the multiple pulse returns on the CTIA output voltage. At the output of the CTIA, there is PMOS source follower device M512. When the row-select signal of row_b 575 goes low, switch M513 turns on, and the CTIA output voltage is passed to a second column line for measurement. The second column line, labeled col_f 535, may be connected to a current source pull-up outside the pixel array.

Figure 6:
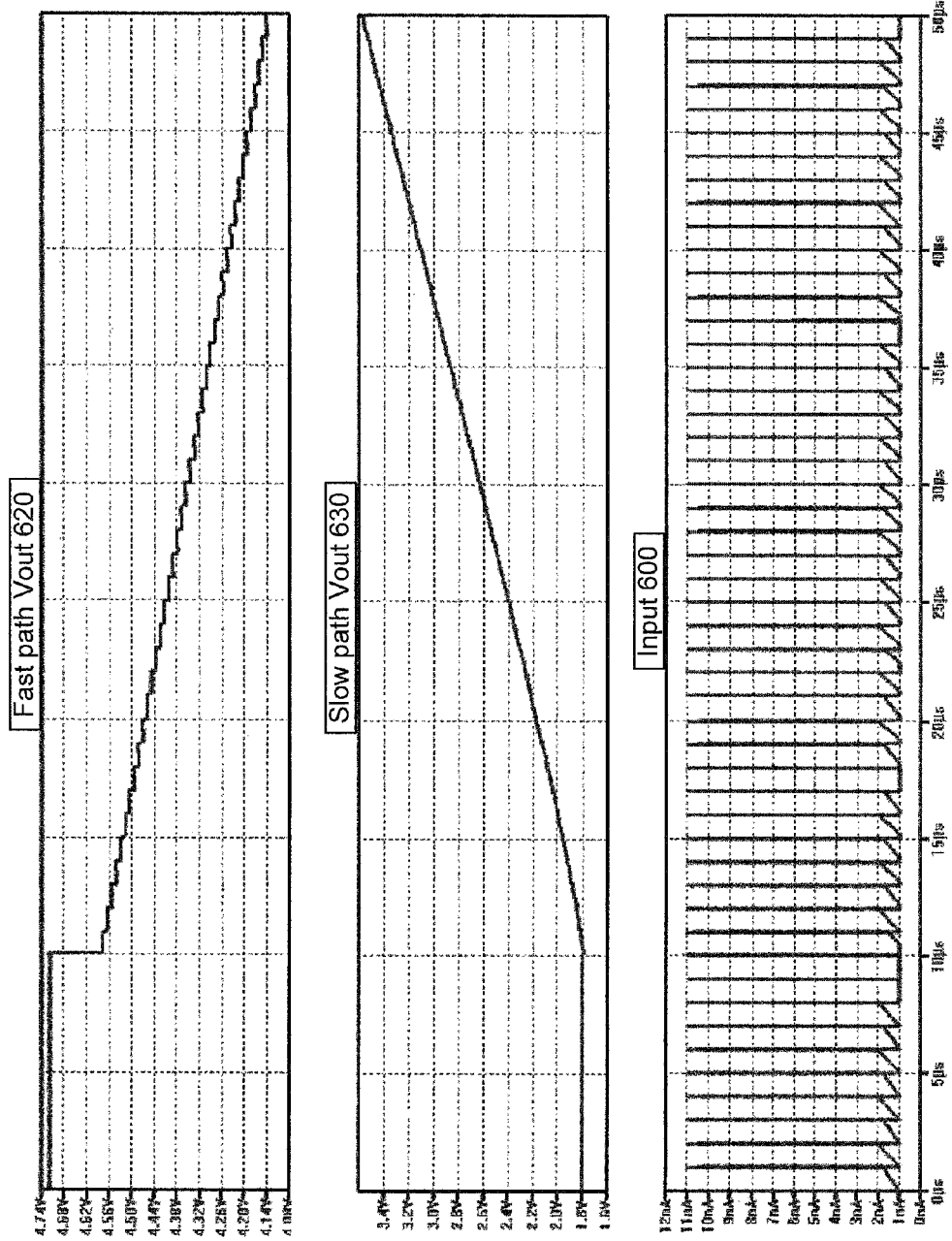
FIG. 6 is an illustration of an exemplary input curve and resulting output curves based on said input curve being processed by an embodiment of the invention.

FIG. 6 is an illustration of an exemplary input curve and resulting output curves based on said input curve being processed by an embodiment of the invention. In this example, a set of input currents are received by the embodiment of FIG. 5, and are processed resulting in a pair of output voltages (i.e., the outputs of the fast path and the slow path). It is to be understood that this figure and the description below are examples only, and are not to limit the potential functionality of other embodiments of the invention.

In this figure, curve 600 illustrates an input received by an ROIC from a photodiode. In this example, curve 600 illustrates that a 15 ns wide pulse of 10 nA is received every 1 μs, as is a DC current of 1 nA. The output of the fast path (i.e., the result of processing curve 600) is shown as curve 620 and the output of the slow path is shown as curve 630. Both curves show charge pedestals that occur as a result of reset signal transitions for each path.

It can be seen from curves 620 and 630 that there is strong isolation between the fast and slow paths, although in this embodiment the amount of isolation between the two paths is finite. It is understood that the average current from the input pulse current as shown in curve 600 is:

$$I(avg.)=(10\ nA)(15\ ns/1\ \mu s)=150\ pA$$

Integrating the average current from the input pulse via a 10 fF capacitor (as shown in FIG. 5), for 40 μl, results in an ideal output voltage swing of the fast path having a value of:

$$V out(fast\ path)=(150\ pA)(40\ \mu s/10\ fF)=600\ mV.$$

For the slow path, the ideal output voltage swing is:

$$V out(slow\ path)=(1\ nA)(40\ \mu s/10\ fF)=4V.$$

As discussed above, it is presumed that the embodiment of FIG. 5 is used to represent said fast path and said slow path. It is to be understood that the dynamic range of the slow path may not accommodate a 4V swing, and thus, the output voltage for the slow path becomes limited at roughly 3.6V as shown in curve 630. At this point, the slow path of the circuit is no longer in the linear range of operation, and the circuit is operating beyond its dynamic range. This occurrence results in the fast path being loaded down by the slow path (the CTIA output of the fast path does not integrate to the proper voltage as a result of the loading effect of the slow path on the fast path), and thus, the output voltage of the fast path may be impacted, as shown in curve 620 (where the voltage swing is 500 mV (125 pA of current)).

Figure 7:
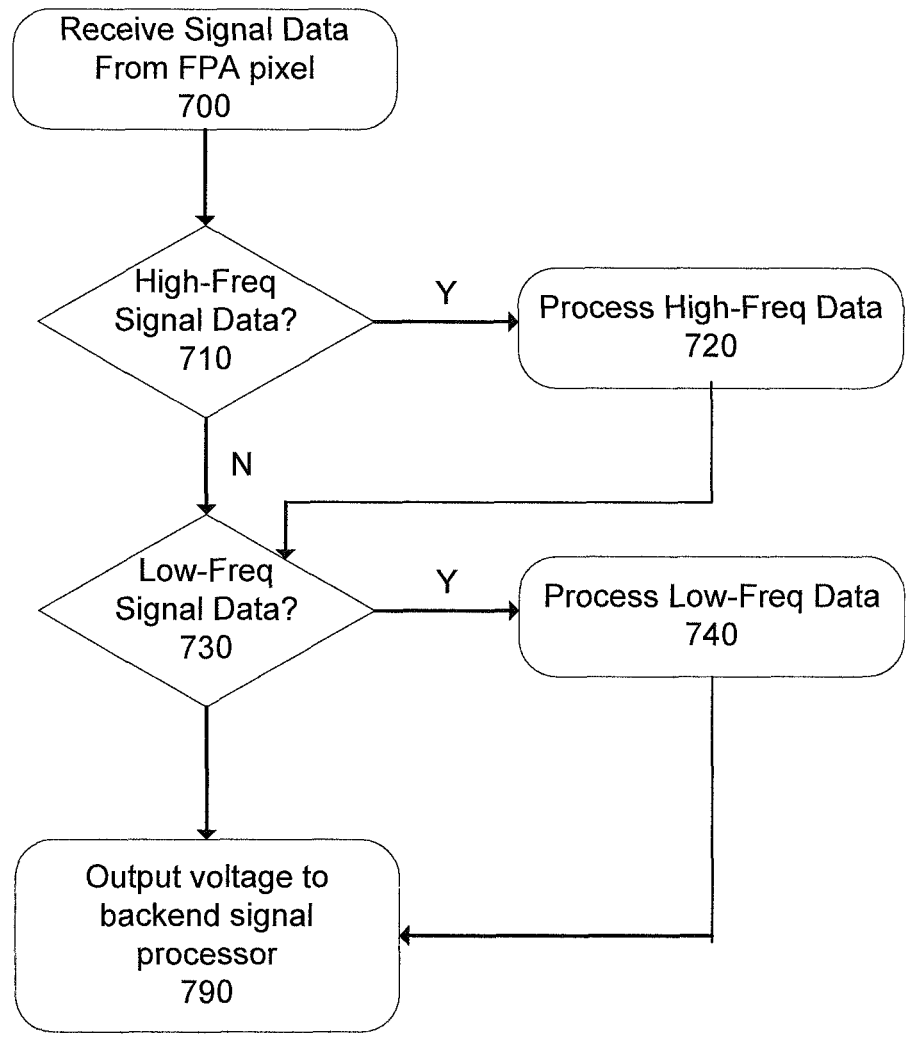
FIG. 7 is a flow diagram of an embodiment of the invention.

FIG. 7 is a flow diagram of an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Data is received from a pixel of an FPA, 700. Embodiments of the invention are not limited to any particular FPA, and thus may be used with FPAs comprising any combination of Si-based materials, GaAs-based materials and InP-based materials.

Said received data may be "split" into high frequency and low-frequency processing paths included in an ROIC. As described above, the frequency dependence of the input impedance of each processing path will "split" the data accordingly. It is determined whether high frequency data is included in the received signal data, 710. If high-frequency data is present, is it processed to produce a first output voltage, 720. As described above, said processing of the high frequency data may include integrating the data (e.g., via a CITA as described above) or may include amplifying the data (e.g., via a RITA as described above). Furthermore, said processing of the high-frequency data may only occur when said data includes both high-frequency noise and a laser return pulse signal. Limiting this processing may be done, for example, by gating sampling operations with the expected return rate of the laser pulse return signal as described above.

Whether or not high-frequency data exists, it is determined whether the received signal data includes low-frequency data, 730. If low-frequency signal data is present, then it is integrated to produce a second voltage output, 740.

Any voltage output produced by the above process will be output to a backend signal processor for further processing, 790 (further processing such as the several example uses described above). It is to be understood that only one processing path of ROICs according to embodiments of the inventions may be used if only one type of data is present or if only one type of data is needed (e.g., one processing path may be disabled for any reasons, said backend signal processing may "ignore" one of the voltage outputs, etc.). Thus, it is to be understood that embodiments of the invention may still operate as a "single" camera under certain conditions; but unlike prior art solutions, embodiments of the invention allow for the "dual" camera capabilities described above.

Reference throughout the foregoing specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments. In addition, it is appreciated that the figures provided are for explanation purposes to persons ordinarily skilled in the art and that the drawings are not necessarily drawn to scale. It is to be understood that the various regions, layers and structures of figures may vary in size and dimensions.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

The invention claimed is:

1. A method comprising:
   receiving signal data from a pixel of a focal plane array (FPA);
   in response to determining the received signal data includes high-frequency signal data, processing the high-frequency signal data via a high frequency path of a read-out integrated circuit (ROIC) to produce a first voltage output; and
   in response to determining the received signal data includes low-frequency signal data, integrating the low-frequency signal data via a low frequency path of the ROIC to produce a second voltage output.

2. The method of claim 1, wherein determining the received signal data includes high-frequency signal data comprises determining the received signal data includes high frequency noise and a laser pulse return signal.

3. The method of claim 2, wherein determining the received signal data includes high frequency noise and a laser pulse return signal is based, at least in part, on an expected return rate of the laser pulse return signal.

4. The method of claim 1, wherein processing the high-frequency signal data comprises integrating the high-frequency signal data, and the high frequency path of the ROIC includes an integrator amplifier to integrate the high frequency signal data.

5. The method of claim 1, wherein the high frequency path of the ROIC includes a resistively loaded transimpedance amplifier (RITA).

6. The method of claim 1, wherein the ROIC is operatively coupled to a signal processor, the signal processor to receive any voltage output produced by the ROIC.

7. The method of claim 1, wherein the FPA is comprised of at least one of Si-based material, GaAs-based material, and InP-based material.

8. An integrated circuit comprising:
   circuitry to receive signal data from a pixel of a focal plane array (FPA);
   a high-frequency signal processing path comprising a first input impedance to enable receiving any high-frequency data present in the received signal data, the high-frequency signal processing path to process any received high-frequency signal data to produce a first output voltage; and
   a low-frequency signal processing path comprising a second input impedance to enable receiving any low-frequency data present in the received signal data, the low-frequency signal processing path to integrate any received low-frequency signal data to produce a second voltage output.

9. The integrated circuit of claim 8, the high-frequency processing path to further determine whether the received signal data includes high frequency noise and a laser pulse return signal.

10. The integrated circuit of claim 9, wherein determining the received signal data includes high frequency noise and a laser pulse return signal is based, at least in part, on an expected return rate of the laser pulse return signal.

11. The integrated circuit of claim 8, wherein processing the high-frequency signal data comprises integrating the high-frequency signal data, and the high frequency path of the ROIC includes an integrator amplifier to integrate the high frequency signal data.

12. The integrated circuit of claim 8, wherein the high frequency path of the ROIC includes a resistively loaded transimpedance amplifier (RITA).

13. The integrated circuit of claim 8, wherein the integrated circuit is to be operatively coupled to a signal processor, the signal processor to receive any voltage output produced by the integrated circuit.

14. The integrated circuit of claim 8, wherein the FPA is comprised of at least one of Si-based material, GaAs-based material, and InP-based material.

15. A system comprising:
   a focal plane array (FPA);
   a signal processor; and
   a read-out integrated circuit (ROIC) operatively coupled to the FPA and the signal processor, the ROIC to include circuitry to receive signal data from a pixel of the FPA,
   a high-frequency signal processing path comprising a first input impedance to enable receiving any high-frequency data present in the received signal data, the high-frequency signal processing path to process any received high-frequency signal data to produce a first output voltage to be received by the signal processor, and
   a low-frequency signal processing path comprising a second input impedance to enable receiving any low-frequency data present in the received signal data, the low-frequency signal processing path to integrate any received low-frequency signal data to produce a second voltage output to be received by the signal processor.

16. The system of claim 15, the high-frequency processing path of the ROIC to further determine whether the received signal data includes high frequency noise and a laser pulse return signal.

17. The system of claim 16, wherein determining the received signal data includes high frequency noise and a laser pulse return signal is based, at least in part, on an expected return rate of the laser pulse return signal.

18. The system of claim 15, wherein processing the high-frequency signal data comprises integrating the high-frequency signal data, and the high frequency path of the ROIC includes an integrator amplifier to integrate the high frequency signal data.

19. The system of claim 15, wherein the high frequency path of the ROIC includes a resistively loaded transimpedance amplifier (RITA).

20. The system of claim 15, wherein the FPA is comprised of at least one of Si-based material, GaAs-based material, and InP-based material.

* * * * *